(12) United States Patent
Kubik et al.

(10) Patent No.: US 8,557,372 B2
(45) Date of Patent: Oct. 15, 2013

(54) LAMINATE FOR PRESERVING FOOD

(75) Inventors: Donald Kubik, Dickinson, ND (US); Barbara Nygaard, Cirlce Pines, MN (US)

(73) Assignee: Northern Technologies International Corp., Beachwood, OH (US)

( * ) Notice: Subject to any disclaimer, the term of this patent is extended or adjusted under 35 U.S.C. 154(b) by 0 days.

(21) Appl. No.: 12/932,470

(22) Filed: Feb. 25, 2011

(65) Prior Publication Data

US 2012/0141642 A1    Jun. 7, 2012

Related U.S. Application Data

(63) Continuation-in-part of application No. 12/927,986, filed on Dec. 1, 2010.

(51) Int. Cl.
*B65D 81/28* (2006.01)

(52) U.S. Cl.
USPC .......................................... 428/220; 426/133

(58) Field of Classification Search
USPC .......................................... 428/220; 426/133
See application file for complete search history.

(56) References Cited

U.S. PATENT DOCUMENTS

| | | | |
|---|---|---|---|
| 2,906,646 A * | 9/1959 | Smith et al. | 426/133 |
| 4,289,830 A * | 9/1981 | Knott, II | 428/475.8 |
| 5,055,328 A * | 10/1991 | Evert et al. | 428/34.9 |
| 5,562,874 A * | 10/1996 | Saad et al. | 264/177.14 |
| 6,028,160 A | 2/2000 | Chandler et al. | |
| 6,787,065 B1 | 9/2004 | Schapira et al. | |
| 7,087,277 B2 | 8/2006 | Yang et al. | |
| 7,588,820 B2 | 9/2009 | Berg et al. | |
| 2003/0129433 A1* | 7/2003 | Hara et al. | 428/515 |
| 2004/0253463 A1* | 12/2004 | Inui et al. | 428/448 |
| 2007/0110854 A1* | 5/2007 | Bagley | 426/106 |
| 2008/0178768 A1* | 7/2008 | Breese | 106/285 |
| 2009/0151598 A1 | 6/2009 | Reinhard et al. | |

FOREIGN PATENT DOCUMENTS

RU    2152725 C1 *    7/2000

OTHER PUBLICATIONS

Derwent Abstract for RU_2152725_C1; Dontsova; Package in the form of layered shrinkable film material for foods, especially for cheeses; Jul. 20, 2000; Derwent; whole document.*

* cited by examiner

*Primary Examiner* — David Sample
*Assistant Examiner* — Tahseen N Khan
(74) *Attorney, Agent, or Firm* — Hudak, Shunk & Farine Co. LPA

(57) ABSTRACT

An all-purpose plastic laminate or wrap as for preserving food that resists penetration of fluids such as water and gases such as oxygen, hydrogen sulfide, sulfur dioxide, and the like. The laminate includes many different embodiments such as at least one hydrophobic outer layer that is free of any volatile corrosion inhibitors, at least one gas resistant barrier layer that can be a hydrophilic polymer, and at least one hydrophobic inner layer that contains a desired additive such as a food safe preservative or antioxidant therein. Optionally at least one tie layer is located between the outer and/or inner layer and said fluid resistant barrier layer. The laminate when applied as a wrap to a food item provides synergistic protection against fluid penetration.

20 Claims, 1 Drawing Sheet

LAMINATE FOR PRESERVING FOOD

CROSS REFERENCE

This application is a continuation-in-part of U.S. Ser. No. 12/927,986 filed Dec. 1, 2010 entitled "A LAMINATE FOR PROTECTING METALS FROM CORROSIVE GASES"; hereby fully incorporated by reference.

FIELD OF THE INVENTION

The present invention relates to an all-purpose plastic laminate or wrap as for preserving food that resists penetration of fluids such as water and gases such as oxygen, hydrogen sulfide, sulfur dioxide, and the like. The laminate comprises many different embodiments such as at least one hydrophobic outer layer that is free of any volatile corrosion inhibitors, at least one gas resistant barrier layer that can be a hydrophilic polymer, and at least one hydrophobic inner layer that contains a desired additive such as a food safe preservative or antioxidant therein. Optionally at least one tie layer is located between the outer and/or inner layer and said fluid resistant barrier layer. The laminate when applied as a wrap to a food item provides synergistic protection against fluid penetration.

BACKGROUND OF THE INVENTION

Heretofore, various polymer laminates have been used as a food wrap to prevent the penetration of fluids therethrough.

U.S. Pat. No. 4,289,830 relates to the addition of a small amount of a phenol to an ethylene-vinyl alcohol oxygen-barrier layer to improve oxygen impermeability under high humidity conditions.

U.S. Pat. No. 7,087,277 relates to a modified ethylene vinyl alcohol polymer (EVOH) comprising an oxygen scavenging functional group. Preferably, the modified EVOH comprises structures IV, V, and VI: as shown. The modified EVOH is useful in oxygen barrier applications, such as a forming an oxygen barrier layer of a packaging article. Also disclosed are methods of modifying ethylene vinyl alcohol polymers, and using the modified EVOH to make packaging articles as a barrier to entry by atmospheric oxygen.

U.S. Pat. No. 7,588,820 relates to packaging film for use in inhibiting corrosion in packaged goods and includes a polymeric substrate resin, between about 1 and 2% by weight of one or more corrosion inhibiting materials, and between about 2 and 10% by weight of nano-clay particles. The packaging film may be formed as a multiple layer co-extruded film, wherein a first polymeric layer is disposed between a second polymeric layer including nano-clay particles, and a third polymeric layer including one or more corrosion inhibitor materials.

SUMMARY OF THE INVENTION

The all-purpose fluid resistant laminate of the present invention such as a food wrap generally comprises at least one hydrophobic outer layer, at least one gas resistant barrier layer, and at least one hydrophobic inner layer that contains a food safe antioxidant therein. The inner layer can be the same as the outer layer and primarily serves to retard water as well as gases from passing therethrough. Optionally, but desirably a tie layer binds the outer layer to the barrier layer and/or the inner layer to the barrier layer. The fluid resistant food wrap laminates of the present invention can also contain multiple outer and/or inner, multiple tie, or multiple fluid barrier layers. The various laminates of the present invention have been found to yield synergistic results with respect to protecting items such as food from liquids and gases.

The present invention comprises a food wrap laminate, comprising at least one hydrophobic thermoplastic polymer layer; at least one barrier layer; and optionally, a tie layer that is compatible with said hydrophobic polymer layer and said barrier layer; wherein at least one of said layers contains a food preservative.

The present invention further relates to a food wrap laminate, comprising at least one outer hydrophobic thermoplastic polymer layer; at least one barrier layer; at least one first tie layer that is compatible with said outer layer and said barrier layer and is located between said outer polymer layer and said barrier layer; at least one inner hydrophobic thermoplastic polymer layer, at least one second tie layer that is compatible with said barrier layer and said inner layer; and wherein at least one of said layers contains a food preservative.

DETAILED DESCRIPTION OF THE INVENTION

Figure 1:
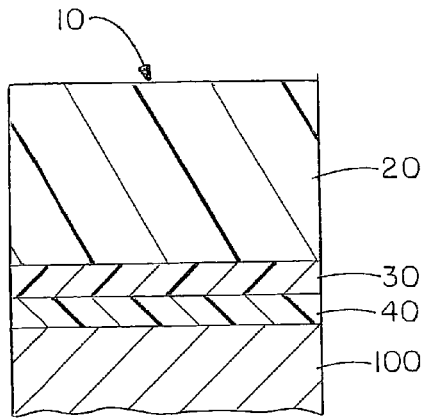
FIG. 1 is a cross sectional view of a three layer fluid resistant laminate.
Figure 2:
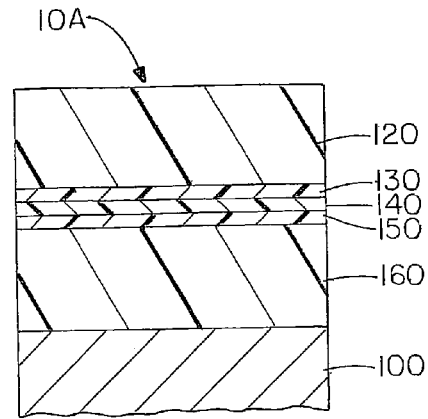
FIG. 2 is a cross sectional view of a five layer fluid resistant laminate.
Figure 3:
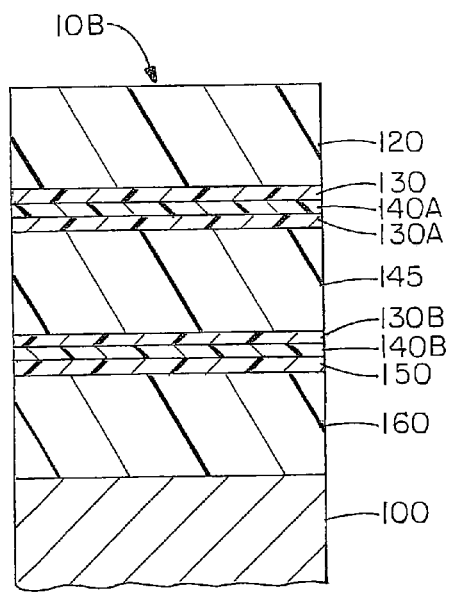
FIG. 3 is a cross-sectional view of a nine layer fluid resistant laminate containing an outer and a middle layer, four tie layers, two barrier layers, and one inner layer.
Figure 4:
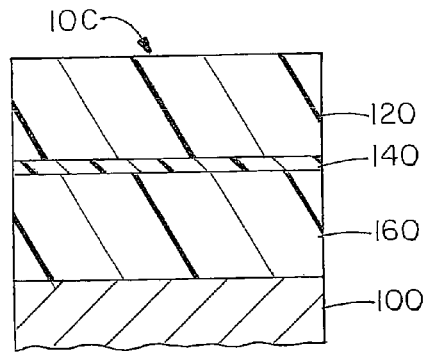
FIG. 4 is a cross sectional view of a three layer fluid resistant laminate of the present invention containing an inner layer, an outer layer, with a barrier layer therebetween.
Figure 5:
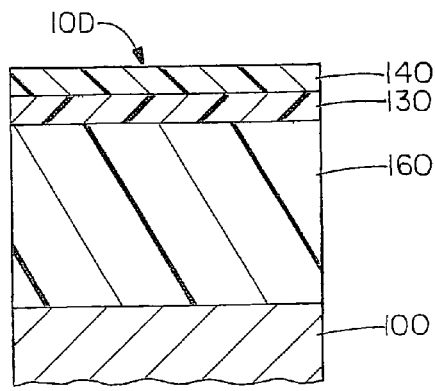
FIG. 5 is a cross sectional view of a three layer fluid resistant laminate of the present invention wherein a barrier layer is an outer layer.

The present invention relates to a fluid resistant laminate to protect various objects, and will be described with regard to a preferred embodiment of a food wrap. Thus, one embodiment of the present invention is shown in FIG. 1 wherein food wrap laminate 10, used for protecting food or a food item 100 from fluids, comprises outer layer 20 that is bonded to barrier layer 40 by tie layer 30. According to another embodiment of the present invention, a food wrap laminate 10A comprises five layers as shown in FIG. 2. Layer 120 is a top outer layer that is bonded to barrier layer 140 by tie layer 130. An inner layer 160 is also bonded to barrier layer 140 by second tie layer 150. Still another embodiment relates to a nine layer food wrap laminate 10B as shown in FIG. 3 wherein outer layer 120 and inner layer 160, are connected respectively by tie layers 130 and 150 to top barrier layer 140A and to bottom barrier layer 140B. A third so-called middle outer layer 145 is connected respectively by tie layer 130A to barrier layer 140A and on its remaining side by tie layer 130B to barrier layer 140B. Yet another embodiment, is shown in FIG. 4 wherein three-layer food wrap laminate 10C comprises outer layer 120 and an inner layer 160, that are separately bonded to opposing sides of layer 140. Optionally, a tie layer can be blended into the outer and/or inner layer. FIG. 5 relates to an inner layer 160 that is bonded to barrier layer 140 by tie layer 130. These and other embodiments within the ambit of the present invention are described hereinbelow.

It is an aspect of the present invention that whether the laminate of the present invention has three layers, five layers, or any other number of primary layers, each layer, independently, can comprise two or more sub layers, such as up to three, four, five, six, or eight total sub layers, wherein each sub layer, independently, can have the same or different composition. Thus, numerous combinations of sub layers exist with regard to forming an individual overall layer such as an outer layer, a tie layer, or a barrier layer.

The outer and inner layers of the multilayer laminates or films can be the same or different materials and can be made out of many different types of polymer as set forth hereinbelow such as polyester, nylon, and the like, with polyolefins being preferred due to their low cost and good water and water vapor resistance and also since they comprise up to about 90% by weight of the total laminate weight. Still another aspect of the present invention is that the various outer and/or inner layers can be tailor made, depending upon the type of processing equipment available, by a particular manufacturer to reduce construction expenses of the various laminates. For example, extrusion equipment can be utilized, or multilayer cast lines can be utilized, or blown multilayer lines can be used to make food wrap laminates. Thus, inner and/or outer layer polymers are utilized that: 1) are suitable stable thermoplastic resins (petroleum or bio-based) which can produce blown or cast multilayer film; and 2) possess the required physical properties, i.e. strength, puncture resistance, UV resistance, tear resistance, temperature resistance, and other required fluid resistant properties.

The one or more outer and/or inner layers, independently, comprise one or more hydrophobic thermoplastic polymers such as a polyolefin, e.g. polyethylene, low density polyethylene, high density polyethylene including high molecular weight and ultra high molecular weight polyethylene, polypropylene and copolymers thereof; one or more polymers derived from dienes such as copolymers of acrylonitrile-butadiene-styrene (ABS), copolymers of polybutadiene, or polychloroprene, and copolymers of butadiene and styrene; polystyrene or methyl methacrylate-styrene; one or more halocarbon containing polymers or copolymers such as polychlorotrifluoroethylene, polytetrafluoroethylene, fluorinated ethylene polypropylene copolymer, polyvinylchloride, polyvinylidene chloride, polyvinylidene fluoride, and blends of polyethylene and polytetrafluoroethylene; heterochain thermoplastic such as polyaryletherketone copolymers of melamine formaldehyde; various polysulfides; various polyphthalamides; thermoplastic polyurethanes; various polyamides such as Nylon 6-6, or 6-10; various polyesters such as polyethylene terephthalate; or any combinations of the preceding. Preferred outer and/or inner layer polymers include polyolefins and copolymers as well as derivatives thereof, and bio-source or petroleum-based polyesters and polyamides. A highly preferred outer polymer is polyethylene and the various low or high density variations thereof since the same are strong, economical, and have good water penetration resistance, and good puncture resistance. The various polyethylenes are also preferred in situations where good water and/or water vapor resistance is desired as in humid environments since they have relatively low water vapor transmission rates (WVTR). Other desirable low WVTR polymers include hydrophobic-type polymers, other polyolefins and various rubbers and thus the amount of any blended hydrophilic polymers such as polyesters is kept low. That is, the amount of any such hydrophilic polymers blended with a polyolefin type or a polymer derived from a diene is generally less than about 10 parts by weight, desirably less than about 5 parts by weight, desirably less than about 2 parts by weight, and very preferably nil, that is contains no hydrophilic compound, per every 100 total parts by weight of the individual layer such as the outer and/or inner layer polymer, or tie layer.

The thickness of the total of all inner and outer layers is generally from about 65% to about 93%, desirably from about 70% to about 90%, and preferably from about 80% to about 85%, of the total thickness of the food wrap laminate. Thus, the thickness of an individual outer layer or an individual inner layer will vary depending upon the total number of outer and inner layers within a laminate. With respect to a five layer laminate, as set forth in FIG. 2, the thickness of the outer layer as well as the thickness of the inner layer, independently, will be from about 0.8 to about 2.2 mils and desirably from about 1.0 to about 1.9 mils, as for example based upon a laminate having a total thickness of about 4 mils. Of course, depending upon desired end use, the total thickness of the food wrap laminate, regardless of the number of layers therein, can vary greatly. Alternatively, the total weight of the inner and/or outer layers can range from about 65% to about 93% and desirably from about 70% to about 90% by weight of the total weight of the food wrap laminate.

The various outer and/or inner layers can contain various food safe colorants and/or dyes to impart a desired color to the overall laminate. Suitable pigments, colorants or dyes that are known to the art and to the literature can be utilized such as titanium dioxide, carbon black, red iron oxide, and the like.

Since the laminates of the present invention are utilized with regard to food products, an important aspect thereof is not to utilize any additives that can be harmful to any type of food. Thus, additives such as biocides, antistats, and flame retardants are avoided. Volatile corrosion inhibitors (VCIs) that are generally utilized in laminates for protecting metals against corrosion are also avoided in the United States of America unless approved by the United States Food and Drug Administration. That is, any laminates of the present invention are generally free of any such additives or VCI compounds regardless of the layer, for example tie layer, barrier layer, or inner and/or outer layer. In other words, any amount utilized is very small such as less than about 1.0 part by weight or less, desirably less than about 0.5 parts by weight or less, and preferably nil, that is no parts by weight per 100 total parts by weight of the individual inner, outer, tie, or barrier layer. Examples of VCIs that are approved for use in the food include benzoic acid, potassium nitrite, and sodium nitrite.

The food wrap barrier layers of the present invention can be hydrophilic and include various polyamides and polyamide copolymers. Amorphous polyamides, e.g. made by DuPont can also be utilized. Copolymers of polyamides include Nylon 610 and 612. A preferred polyamide copolymer is Nylon MXD6 from Mitsubishi Gas Chemical Company, Inc. which is polycondensation of meta-xylene diamine (MXDA) with adipic acid. This nylon copolymer has been found to have superior gas barrier properties such as with respect to oxygen and carbon dioxide, low water absorption, a high glass transition temperature, high tensile and flexural strength and modulus as well as excellent gas barrier properties. Blends of polyamides and polyamide copolymers can be utilized with other polymers such as polyvinyl alcohol or polyethylene-vinyl alcohol. A blend of an amorphous nylon with a polyethylene-vinyl alcohol resin is Selar® PA 2072 made by DuPont wherein the amount of the amorphous nylon can generally range from about 10.0% to about 60% and desirably from about 20.0% to about 40% by weight based upon the total weight of the amorphous nylon and the polyethylene-vinyl alcohol.

Other food wrap barrier layers include polyvinyl acetate and copolymers thereof or blends thereof with another polymer.

Preferred barrier layer polymers also include polyvinyl alcohol or copolymers thereof such as polyolefin-vinyl alcohol wherein the olefin has from 2 to 6 carbon atoms, and blends thereof with other polymers such as ethylene or propylene can also be used. Examples of polyvinyl alcohol polymers include Eval E® made by Kuraray of Japan, Eval F® also made by Kuraray of Japan, and Soarnol D® sold by Nippon Gohsei of Japan. Copolymers of polyvinyl alcohol with ethylene are highly preferred. The amount of ethylene in the copolymer is generally from about 30 to about 45 mole %, desirably from about 34 to about 42 mole %, and preferably about 36 to about 40 mole % with the vinyl alcohol mole content being the remaining, that is from about 55 to about 70 mole %, desirably from about 58 to about 66 mole %, and preferably from about 60 to about 64 mole %. A suitable ethylene-vinyl alcohol copolymer is Soarnol ET3808 made by Soarnus LLC that contains 38 mole % of ethylene and 62 mole % of vinyl alcohol.

Another preferred food wrap barrier layer is made from carbon monoxide copolymer or interpolymers with either vinyl alcohol homopolymers or olefin-vinyl alcohol copolymers such as ethylene-vinyl alcohol copolymers, or blend thereof with other polymers. Such polymers are set forth in WO 01/11470 which is hereby fully incorporated by reference with regard to all aspects thereof including ratios and weight amounts of the ethylene-carbon monoxide copolymer and the polyvinyl alcohol copolymer, and the like.

Another desired barrier layer material of the present invention is polyvinylidene chloride and copolymers thereof with vinyl chloride, acrylonitrile, or acrylates, as for example a copolymer of vinylidene chloride and methyl acrylate such as XU 32019.L from Dow.

The above barrier materials minimize the permeation of oxygen, water vapor, and other gases, as well as odors. These barrier layer materials can be used in the design of multi-layer blown films or alternatively, can be extruded. Moreover, optionally various scavenger additives can be utilized in the various layers but preferably are utilized in the barrier layer. Examples of scavengers include carbon, salt such as sodium chloride, zinc carbonate, metallic nanoparticles such as copper, silver, or combinations thereof, Bruggolite FF6M, and the like. These scavengers are utilized in amounts that are safe with regard to contact with food and suitable amounts thereof generally range from about 0.001% to about 5.0% and preferably from about 0.01% to about 4.0% of the total weight of the individual layer such as the inner layer, barrier layer, and the like.

The food wrap barrier layer instead of preferably being one layer can be made of various sub-layers wherein each sub-layer, independently, can be of the same or a different polymer as those set forth hereinabove. The total thickness of a preferred single barrier layer of a laminate as set forth in FIG. 2 will vary depending upon the thickness of the overall laminate, but is generally from about 0.1 to about 0.6 mil, and desirably from about 0.2 to about 0.4 mil, for a food wrap barrier laminate having a total thickness of about 4 mils. Alternatively, the total weight of the food wrap barrier layer can range from about 2 or 3 wt. % to about 8 or 10 wt. % based upon the total weight of the food wrap laminate.

The food wrap barrier layer of the present invention can optionally but desirably contain small amounts of a phenol additive and preferably an ortho-substituted phenol generally having a melting point below about 200° C. While numerous phenol compounds exist as set forth in U.S. Pat. No. 4,289,830 hereby fully incorporated by reference, the following compounds are desired, 2-hydroxy-4-octoxybenzophenone, 2-hydroxy-4-methoxybenzophenone, 2,4-dihydroxybenzophenone, octyl 3-(3',5'-di-t-butyl-4'-hydroxy)phenyl propionate, 2(2'-hydroxy-3',5' di-tert-amyl)phenyl-benzotriazole, tertiary butyl salicylate, t-butylhydroquinone, and any combination thereof. The amount of the phenol compound in the corrosion gas barrier layer such as a copolymer of ethylene and vinyl alcohol copolymer generally ranges from about 0.5 to about 10, desirably from about 0.7 to about 5, and preferably from about 0.8 to about 2 or 3 parts by weight based upon 100 total parts by weight of the hydrophilic or corrosion gas resistant barrier layer.

A tie layer can be utilized to bond the food wrap barrier layer to the outer and/or inner layer. Thus, the tie layer is desirably compatible with the outer and/or inner layer as well as the barrier layer. As used in this specification, "compatible" means that a particulate layer will adhere or bond to an adjacent layer and not easily separate therefrom. Thus, tie layer materials or polymers are utilized that readily adhere to an adjacent barrier layer as well as to an adjacent outer or inner layer. If the outer and/or inner layer is a hydrophobic layer such as polyethylene or a rubber, hydrophilic polymers are avoided for the tie layer inasmuch as they are incompatible therewith. The tie layer can be a preferred single layer, or two more sub-layers. Tie layers of the present invention are desirably polymers and include various acrylate and methacrylate polymers wherein the ester portion can contain from 1 to about 12 carbon atoms. Blends of the various acrylates with polyolefins can also be utilized. The tie layer can also comprise polymeric anhydride such as polymers of maleic anhydride optionally having a substituted alkyl group (e.g. $C_1$-$C_{10}$) or a substituted aryl group or a substituted alkyl aromatic group with the alkyl having from 1 to about 5 carbon atoms. Modified polymers, e.g. copolymers of an anhydride or of maleic anhydride with olefins such as ethylene or propylene, or with ethylene vinyl acetate, or with ethylene acrylate can also be utilized.

Specific examples of tie layers include anhydride chemically modified polyethylene such as Admer NF 908A (Mitsui Chemical), anhydride chemically modified low density polyethylene such as Bynell 4208 (DuPont), or anhydride chemically modified linear low density polyethylene such as Plexar® PX3236 made by Equistar. These copolymers generally contain from about 30 to about 40 mole percent olefin. Of course, generally any type of polyolefin can be utilized that is modified by maleic anhydrides such as high density polyethylene, low density polyethylene, etc.

The total thickness of each of the two single tie layers as set forth in FIG. 2, independently, is from about 0.1 to about 0.6 mils, and desirably from about 0.2 to about 0.4 mils, based upon a food wrap laminate having a total thickness of about 4 mils. Alternatively, the total weight of the one or more tie layers can be from about 5 to about 20%, desirably from about 7% to about 18% by weight based upon the total weight of the food wrap laminate.

According to another embodiment of the present invention, while the tie layer can generally be a separate layer as shown in the embodiment of FIGS. 1, 2, and 3, it can also be blended, as by calendering or extruding, with the inner and/or outer layers 20, 120, 145, or 160 of FIGS. 1, 2, and 3. That is, in order to reduce the number of processing operations, the components of the inner/outer layer and the tie layer can be melt blended to form generally one uniform or homogeneous outer-tie layer. In this situation, the embodiment of FIG. 1 would only have two layers, the blended outer layer 20 and the barrier layer 40, whereas in the embodiment of FIG. 2 would have only three layers, i.e. outer layer 120 and inner layer 160 separated by an intermediate barrier layer 140. The embodiment of FIG. 2 wherein the tie layer is blended with the outer and the inner layer is shown in FIG. 4. Alternatively, the embodiment of FIG. 4 need not contain any tie layer blended therein so long as the inner and outer layer is compatible with barrier layer 140, but the same is generally not preferred.

While desirably and preferably the outer and/or inner layers are located respectively on the outer side of the laminate or on the inner or food facing side of the laminate, the barrier layer can be located on the outside of the laminate with an inner layer being located on the side of the laminate that is adjacent, contacts, or spaced apart from the food to be protected against fluids. Such an embodiment is shown in FIG. 5. FIG. 5 is thus representative of the food wrap laminate of the present invention wherein the one or more barrier layers of the food wrap is located on the outside of the laminate with one or more inner polymer layers located on the inside of the laminate. As with the above embodiments, the use of a tie layer is optionally, but generally desired. The tie layer can be one or more separate layers 130 as shown in FIG. 5, or the tie layer can be blended with inner layer 160. With regard to the thicknesses of the various layers of the embodiment of FIG. 5, they are as set forth below. That is, the total thickness of the one or more inner layers is by far the thickest amount of a laminate, with the total of one or more food wrap barrier outer layer being very thin in comparison as is the one or more tie layers based upon the total thickness of the food wrap laminate.

An alternative aspect of the present invention is that in addition to the three layer embodiment of FIG. 1 or the five layer embodiment of FIG. 2, numerous other embodiments exist that contain one or more additional inner and/or outer layers, or one or more additional barrier layers, and/or one or more additional tie layers desirably located between the additional inner and/or outer layers and the additional barrier layer. In such embodiments, a so-called outer layer can reside within the laminate, e.g. a middle layer and not be located on an external surface thereof; see FIG. 3. Also, the embodiments of FIGS. 1 and 2 can, independently, contain one or more additional inner and/or outer layers that are bound by a tie layer to an adjacent barrier layer or, alternatively, one or more hydrophilic or barrier layers that are bound desirably by a tie layer to an adjacent outer or inner layer. Thus, the number of so-called laminate possibilities or embodiments is exceedingly large. For example, the total number of laminate layers can range up to about 8, up to about 10, or up to about 15, and so forth. It is further noted that in all of these embodiments the additional one or more outer and/or inner layers, one or more tie layers, and/or one or more corrosion gas resistant barrier layers can, independently, be the same or different type of compound or polymer, respectively, as any other outer and/or inner layer, tie layer, or barrier layer.

As a specific example of a laminate embodiment of the present invention, reference is made to FIG. 2. Outer layer 120 is made of polyethylene and is approximately 40% by weight of the total weight of the five layer laminate. Tie layer 130 is an ethylene-anhydride copolymer, or an ethylene chemically modified anhydride copolymer and is approximately 6% by weight of the total laminate weight. Center or barrier layer 140 is polyethylene-vinyl alcohol copolymer containing about 30 to about 40% by weight of ethylene repeat units therein. The barrier layer is approximately 6% by weight of the total weight of the laminate. Tie layer 150 is the same type of polymer of tie layer 130 and also is approximately 6% by weight of the total weight of the laminate, and inner layer 160 is a polyethylene layer and is approximately 40% by weight of the total weight of the laminate.

The overall thickness of the various food wrap laminates of the present invention can vary largely depending upon the substrate or article it is to cover, wrap, contain, etc., but generally can range from about 0.6 mil to about 10.0 mil, desirably from about 0.8 mil to about 6.0 mil, and preferably from about 1.0 mil to about 5.0 mils. Based upon a total laminate thickness of 100%, the total thickness of the one or more outer and/or inner layers is by far the largest ranging from about 65% to about 93%, desirably from about 70% to about 90% and preferably from about 80% to about 85%. The total thickness of one or more tie layers is from about 3% or 5% to about 20%, desirably from about 7% to about 18% and preferably from about 9% to about 15%. The total thickness of the one or more barrier layers is from about 2% to about 15%, desirably from about 3% to about 10%, and preferably from about 4% to about 8%. When the tie layer compounds are blended with either the inner and/or outer one or more layers, the total thickness of the blended outer and/or inner layers is from about 75% to about 98%, desirably from about 80% to about 97% and preferably from about 90% to about 96% based upon the total thickness of the laminate, with the difference being the total thickness of the one or more barrier layers.

The food wrap laminates of the present invention such as set forth in FIGS. 1, 2, 3, 4, and 5 comprise one or more preservatives that resist the penetration of fluids therethrough that can decay or decompose food 100. Fluids include water, saline solutions, steam, oils, and the like. Examples of decay or decomposing gases include oxygen, halogen gases, hydrogen sulfide, sulfur dioxide, HCl vapors, and the like. The food wrap laminates of the present invention unexpectedly have large improvements with regard to resisting penetration of food harmful fluids therethrough. For example, the laminates generally exhibit a penetration of about 10% or less, desirably about 5% or less, and preferably about 1% or about 0.1% or less with respect to various fluids as that compared to plain polyethylene of equal thickness with respect to permeation per unit, time, and area. Additionally, the food wrap laminates of the present invention have unexpected and synergistic reductions with respect to oxygen transmission rates of less than about 1.0, desirably less than about 0.5 and preferably less than about 0.1 or less than about 0.05 cc/100 in$^2$/day. With respect to H$_2$S permeation transmission rates the value was less than about 200, desirably less than about 100, and preferably less than about 50 cc/100 m$^2$/day.

An important aspect of the present invention is that the various polymers utilized either in the inner and/or outer layers, the tie layers, and the barrier layers do not decompose and do not permit moisture and/or the gases to attack the food. Thus, the laminates of the present invention are generally free of biodegradable polymers such as various polyesters that are known to the art and to the literature, for example polylactate. That is, if the laminates do contain biodegradable polymers, they are utilized in small amounts such as less than about 5 parts by weight, desirably less than about 2 parts by weight, and preferably the individual layers such as the barrier, inner, tie, or outer layer are free of and do not contain any biodegradable polymers therein based upon 100 total parts by weight of the total laminate weight.

Another important aspect of the present invention is the utilization of one or more food preservatives that inhibit decay or decomposition of the food. The preservatives can be utilized in any of the one or more above-noted layers such as the outer layer, the barrier layer, the tie layer, and the like and preferably are utilized in the inner layer that contacts, encompasses, encases, encloses, etc., food or a food item. Thus, the food wrap laminates of the present invention inhibit or generally impede the transmission of fluids through the laminate such as for example water and oxygen so that the same do not contact food or food item 100 in any of FIGS. 1-5. The reductions with regard to oxygen and water transmission are at least the same as set forth hereinabove and generally greater due to the utilization of the food preservatives.

With respect to the health of human beings consuming food items that have food preservatives therein, there is perhaps a growing concern that such preservatives may be harmful with respect to at least some human beings and therefore there is a desire to at least partially eliminate, if not totally eliminate, various food preservatives that are added to food. Since the laminates of the present invention contain food preservatives preferably in the inner layer, the laminates can be utilized as a food wrap whereby the need for a preservative in a food can be partially or totally eliminated.

Food preservatives that are generally utilized in food are set forth in the U.S. Food and Drug Administration GRAS (generally recognized safe list) of chemicals utilized in the food industry. Approved food preservatives by the FDA include ascorbic acid, ascorbyl palmitate, benzoic acid, butylated hydroxytoluene (BHT), calcium ascorbate, EDTA, calcium sorbate, caprylic acid, dehydroacetic acid or its sodium salt, disodium ethylenebisdithiocarbamate, erythorbic acid, formaldehyde (paraformaldehyde), methylparaben (methyl-p-hydroxybenzoate), nitrates (sodium and potassium), n-octanoic (caprylic) acid, octyl gallate, potassium metabisulfite, potassium nitrate, potassium sorbate, propionic acid, propylparaben (propyl-p-hydroxybenzoate), quaternary ammonium chloride combination, silver nitrate, silver (metal), sodium ascorbate, sodium benzoate, sodium bisulfite, sodium dimethyldithiocarbamate, sodium metabisulfite, sodium nitrate, sodium nitrite, potassium nitrite, sodium phosphate (monobasic) (monosodium phosphate), sodium propionate, sodium sorbate, sorbic acid, stannous chloride, stearyl citrate, sulfating agents, sulfur dioxide, and tocopherols, or any combination thereof. Of these numerous food preservatives, perhaps sodium nitrite, BHT, sodium benzoate, ascorbic acid, and silver nitrate are the most common. Metals in the form of ions or small nano particles are often used as bactericides. Silver metal in these forms have been shown to be particularly effective.

The total amount of the one or more food preservatives that are utilized in the laminates of the present invention, preferably in only the inner layer, can range from about 0.001% to about 5.0%, desirably from about 0.002% to about 5.0%, and preferably from about 0.01% to about 4.0% of the total weight of the individual layer such as the inner, outer, tie, or barrier layer.

The food wrap laminates of the present invention can generally be utilized to wrap, as for example to package, envelope, surround, enclose, encase, cover, and the like, any food or food product such as various grains, breads, cereal, and chips; various oils and fats; various nuts, various vegetables, various fruits, and various meats. Examples of the grain and bread group include soybean, oats, rice, wheat, barley, and the like; examples of the oil and fat group include vegetable oil, cottonseed oil, soybean oil, and the like; examples of various nuts include peanuts, walnuts, pecans, cashews, almonds, and the like; examples of various vegetables include lettuce, carrots, onions, herbs, avocado, beans, and the like; examples of various fruits include bananas, apples, oranges, mangos, grapefruits, pineapples, and the like; and examples of various meats include pork, beef, chicken, turkey, lamb, and buffalo, and the like.

Fillers are generally not desired especially those that reduce the elongation of the laminates since the same can result in formation of cracks, tears, cuts, etc., that reduce the resistance to the penetration of harmful gases and can lead to openings that will readily permit the gases to attack the food. Mineral fillers such as clays, chalks, carbonates, talcs, nanoclays, silica, and the like are thus avoided. That is, the various individual layers of the laminate contain generally less than about 5 parts by weight, desirably less than about 2 parts by weight, and preferably are free of, i.e. contain no parts by weight of any such fillers per 100 parts by weight of the individual layer such as the tie, inner, outer, or barrier layer.

The preparation of the food wrap laminates of the present invention can generally utilize commercial methods, for example coextrusion, calendering, and utilize commercial blown multilayer equipment or cast multilayer equipment, and the like. Two such methods are set forth as follows.

The polymers or resins of the outer and/or inner layers including optional tie layer components therein are added to a gravimetric additive feeder. Such polymers, as noted above, include low density polyethylene, polypropylene, high density polyethylene and the like. These polymers can be fed into existing material streams or combined with a weight throughput monitor hopper. This process ensures even layer thicknesses. The screw speed is controlled via a weight reduction of the weighing hopper.

A central blending station is used to pre-blend additives and resins. These resins and additives are accurately weighed and added to a spinning cylinder with mixing blades to uniformly distribute the additives and polymers.

With regard to a co-extrusion process, the various outer and/or inner layers as well as the optional tie adhesive layer compounds can be pre-blended and added to the gravimetric feeders that feed the extruders which produce the inner and outer layers. Barrier resin or polymers are added to the core or middle extruder. The extruders deliver a steady volumetric throughput of different viscous liquids to a single extrusion die. This process welds together the various layers by keeping them separate. The layer thicknesses are controlled by the speed and individual extruders delivering the material.

With respect to a general blown film extrusion process, the measured outer and/or inner polymers or resins are introduced into the extruder. The melted (liquid) material is pushed (pumped) under continuous pressure, through a circular die to form a thin walled tube. Air is introduced in the middle of the die to blow the tube. The film is cooled by using an air ring mounted at the top of the die. The blown film tube is flattened through nip rollers and forms a lay flat tube which passes through rollers. Various tubing or sheeting forms can be converted into bags by heat sealing across the width of the film. Converted bags can be perforated on a roll or individually cut.

The laminates of the present invention be used to form various structures such as, but not limited to containers, pouches, bags, housings, cases, canisters, cartridges, vessels, and vats.

The present invention will be better understood by reference to the following examples which serve to illustrate, but not to limit the present invention.

Two Controls were prepared as well as two Examples according to the present invention. Control 1 merely related to a 100% low density polyethylene film having a total thickness of 4 mils. Control 2 utilized a commercial product, that is, Zerust® made by NTIC of Circle Pines, Minn., also having a total thickness of 4 mils. Control 2 was a low density polyethylene layer containing approximately 0.5 weight percent of sodium nitrite and approximately 0.5 wt. % of butylated hydroxytoluene, (BHT), both of which can be utilized as a volatile corrosion inhibitor but also as a food preservative. Example 1 was a five layer laminate of the present invention similar to that shown in FIG. 2 containing as the tie layers a copolymer of ethylene-maleic anhydride and as the barrier layer a copolymer of ethylene-vinyl alcohol. The total thickness of Example 1 was 4 mils and it did not contain any food preservative. Example 2 was a laminate of the present invention essentially identical to that of Example 1 except that one of the hydrophobic layers (e.g. inner layer) contained approximately 0.5% by weight of sodium nitrite. A description of the layers of the two Controls and two Examples are set forth in Table 1.

TABLE 1

| | Type of Layer | Composition | Thickness |
|---|---|---|---|
| Control 1 | Hydrophobic layer | 100% low density polyethylene | 4 mil |
| Control 2 | Hydrophobic layer | low density polyethylene 0.5 wt. % sodium nitrite 0.5 wt. % BHT (2,6-T-butyl-4-methyl phenol) (an antioxidant) | 4 mil |
| Example 1 | Outer layer | 100% low density polyethylene | 41.0% |
| | Tie Layer | Ethylene-anhydride copolymer Plexar ® PX3236 | 6.0% |
| | Gas Barrier Layer | Ethylene-vinyl alcohol copolymer (38 mole %) (62 mole %) | 6.0% |
| | Tie Layer | ethylene-anhydride copolymer Plexar ® PX3236 | 6.0% |
| | Inner Layer | 100% low density polyethylene | 41.0% |
| Example 2 | Hydrophobic layer | low density polyethylene 0.5 wt. % of sodium nitrite | 41.0% |
| | Tie Layer | ethylene-anhydride copolymer Plexar ® PX3236 | 6.0% |
| | Gas Barrier Layer | Ethylene-vinyl alcohol copolymer (38 mole %) (62 mole %) | 6.0% |
| | Tie Layer | ethylene-anhydride copolymer Plexar ® PX3236 | 6.0% |
| | Hydrophobic Layer | 100% low density polyethylene | 41.0% |

Total thickness of Examples 1 and 2 was 4 mil.

The above laminate of Control 1 and 2, and Examples 1 and 2 were tested with respect to oxygen as the corrosion gas as follows:

TABLE 2

| Test Conditions: | | | |
|---|---|---|---|
| Test Gas | Oxygen | Test Temperature | 23.0 (° C.) 73.4 (° F.) |
| Test Gas Concentration | 100% $O_2$ | Carrier Gas | 98% $N_2$, 2% $H_2$ |
| Test Gas Humidity | 90% RH | Carrier Gas Humidity | 0% RH |
| Test Gas Pressure | 760 mmHg | | |

| Test Results: | |
|---|---|
| Sample Identification | Oxygen Transmission Rate cc/(100 in²/day) |
| 100% LDPE Control | 122 |
| Oxygen Barrier Example 1 | 0.0239 |
| Oxygen Barrier Example 2 | 0.0199 |

The above laminates were analyzed on a MOCON Oxtran 2/21 instrument. The test standards that were utilized include ASTM D-3985, ASTM F-1927; DIN 53380, JIS K-7126 and ISO CD 15105-2.

As apparent from Table 2, the transmission rate of oxygen with respect to Control 1, low density polyethylene was very high, i.e. 122. In contrast thereto, Example 1 of the present invention which contained a 5-layer laminate was a very effective oxygen resistant laminate having an oxygen transmission rate of 0.0239 whereas Example 2 was also a 5-layer laminate according to the present invention additionally containing sodium nitrite as a food preservative had an oxygen transmission rate of 0.0199. Thus, the preservative containing layer would preferably be utilized as an inner layer with regard to the food wrap laminate. Moreover, the laminates of the present invention resulted in an unexpected and synergistic decrease in the transmission rate of oxygen through the laminates of at least 5,000!

The above four laminates as set forth in Table 1 were also tested with respect to hydrogen sulfide as the gas as follows:

Test Procedure

Films were stretched over a 60 cc Teflon jar. The center portion of the jar cap was removed so the film would be exposed to the outside environment. The 60 cc Teflon jar has an inlet and outlet tube attached to the sides. The corrosive gas, $H_2S$ was connected to the tubes allowing a gas flow of 10 cc/min to go in and out of the jar on a continuous basis. The Teflon jar was placed inside an outer vessel and sealed. As the gases permeated through the laminate they were captured in the outer chamber having a probe located therein. The SPME (metal oxide coated silica fibers) located within the probe were exposed for 10 minutes to the headspace and then injected into a GC inlet for area count comparison to a known concentration standard. For hydrogen sulfide permeation values, two connectors were added to the top of the outer vessel. One connector was attached to an Arizona Instrument Jerome 631-X $H_2S$ analyzer. As the Jerome pulled a sample from the headspace volume for analysis, this volume was replaced by allowing clean air filtered through a carbon bed to be drawn back into the vessel. The headspace was stirred prior to sampling to ensure a uniform sample.

Test Results

The noted 4 different laminates were tested with regard to $H_2S$ penetration over various periods of time and the results thereof are set forth in Table 3.

TABLE 3

| | Exposure Time | Permeation Concentration ppm $H_2S$ |
|---|---|---|
| Gas concentration: 100 ppm $H_2S$ Control 1 | | |
| Start | 0 min | BDL |
| | 16 hrs | 0.16 |
| | 24 hrs 10 min | 1.10 |
| | 40 hrs 40 min | 0.70 |
| | 51 hrs 55 min | 0.89 |
| | 195 hrs 50 min | 0.92 |
| | 205 hrs 5 min | 0.98 |
| | 226 hrs 20 min | 1.50 |
| | 245 hrs 55 min | 1.80 |
| | 249 hrs 55 min | 1.50 |
| | 269 hrs 45 min | 1.30 |
| | 273 hrs 30 min | 1.70 |
| Gas concentration: 100 ppm $H_2S$ Control 2 | | |
| Start | 0 min | BDL |
| | 16 hrs | 0.09 |
| | 24 hrs 15 min | 0.11 |
| | 40 hrs 35 min | 0.21 |
| | 52 hrs | 0.53 |

TABLE 3-continued

|  |  |  |
|---|---|---|
|  | 195 hrs 55 min | 0.67 |
|  | 205 hrs | 0.69 |
|  | 226 hrs 10 min | 0.98 |
|  | 246 hrs | 1.10 |
|  | 250 hrs 10 min | 1.20 |
|  | 269 hrs 55 min | 1.15 |
|  | 273 hrs 50 min | 1.15 |
|  | Gas concentration: 100 ppm $H_2S$ Example 1 | |
| Start | 0 min | BDL |
|  | 16 hrs | 0.004 |
|  | 24 hrs | 0.004 |
|  | 40 hrs 50 min | 0.000 |
|  | 51 hrs 45 min | 0.006 |
|  | 195 hrs 45 min | 0.004 |
|  | 205 hrs 15 min | 0.020 |
|  | 226 hrs 15 min | 0.017 |
|  | 245 hrs 15 min | 0.018 |
|  | 249 hrs 45 min | 0.015 |
|  | 269 hrs 30 min | 0.019 |
|  | 272 hrs 30 min | 0.017 |
|  | Gas concentration: 100 ppm $H_2S$ Example 2 | |
| Start | 0 min | BDL |

TABLE 3-continued

|  |  |  |
|---|---|---|
|  | 16 hrs | BDL |
|  | 24 hrs 5 min | BDL |
|  | 40 hrs 45 min | BDL |
|  | 51 hrs 50 min | BDL |
|  | 196 hrs | BDL |
|  | 205 hrs 10 min | 0.001 |
|  | 226 hrs 30 min | 0.001 |
|  | 245 hrs 50 min | BDL |
|  | 250 hrs | BDL |
|  | 269 hrs 50 min | BDL |
|  | 273 hrs 35 min | BDL |
| Film Number | $H_2S$ value | Permeation Rate |
| Control 1 | 1.7 ppm | 5,712 cc/m$^2$/day |
| Control 2 | 1.15 | 3,864 cc/m$^2$/day |
| Example 1 | 0.017 | 57 cc/m$^2$/day |
| Example 2 | BDL | BDL |

(BDL means below detectable limits)

As apparent from the above table, the laminates of the present invention, i.e. Examples 1 and 2, gave unexpected and synergistic improvements with regard to the reduction of hydrogen sulfide gas penetration as well as reduction of permeation rates through the laminates in comparison to the Controls. Although Examples 1 and 2 were tested with regard to hydrogen sulfide, the laminates of the present invention had vastly better or lower gas transmission rates than the Controls. Moreover, Example 2, which contained sodium nitrite as a food preservative, once again had lower transmission rate than Example 1 that was generally identical except that it did not contain any food preservative.

The same two Controls and the same two Examples as set forth in Table 1 were tested with regard to permeation by chlorine gas in nitrogen. When tested in the manner as set forth above with respect to the oxygen permeation test, results were obtained as set forth in Table 4. Briefly, the test method related to films being stretched over a 60 cc Teflon jar. The center portion of the jar cap was removed so the film would be exposed to the outside environment. The 60 cc Teflon jar has an inlet and outlet tube attached to the sides. The challenge gas, chlorine, was connected to the tubes allowing a gas flow of 15 cc/min to go in and out of the jar on a continuous basis.

The Teflon jar was placed inside an outer vessel and sealed. As the challenge compounds permeated through the membrane they were captured in the outer chamber.

To determine permeation values a Drager Tube, p/n 6728411, was inserted into the headspace area of the outer vessel. The Drager tube was specifically made to detect chlorine gas as a concentration of 0-5 ppm. As the sample pump drew air out of the outer vessel the volume was replaced by allowing clean air filtered through a carbon bed to be drawn back into the vessel.

The headspace was stirred prior to sampling to ensure a uniform sample.

TABLE 4

|  | Breakthrough time | Equilibration time | ppm Vol. | Dilution | Total Run Time | CI ppmV/m$^2$/day |
|---|---|---|---|---|---|---|
| Control 1 | 816 hrs. | 864 hrs | 0.25 ppm Vol. | 1120 cc | 1032 hrs | 0.025 |
| Control 2 | 180 hrs. | 227 hrs | 0.3 ppm Vol | 1120 cc | 984 hrs | 0.12 |
| Example 1 | BDL | BDL | BDL | 1120 cc | 984 hrs | BDL |
| Example 2 | BDL | BDL | BDL | 970 cc | 720 hrs | BDL |

The following eight examples were made and tested with respect to oxygen permeation. Examples 3, 7, and 9 did not contain any food preservatives therein, e.g. in the outer or inner layer, but the remaining examples, i.e. 4-6 and 8 and 10 did contain sodium nitrite and/or BHT as a food preservative in the inner layer. The results of the oxygen permeability test with regard to Examples 3-10 showed very low oxygen transmission rates, with the transmission rates of examples 4-6 and 8 and 10 containing a sodium nitrite therein having lower oxygen transmission rates than Examples 3, 7, and 9 that did not contain sodium nitrite. The actual oxygen transmission rates were very similar to that set forth in Table 2 with respect to Examples 1 and 2. Thus, once again dramatically reduced and synergistic results were obtained with regard to the food wrap laminates of the present invention.

Example 3

A three layer food wrap laminate having no food preservative additives. (FIG. 4).

A three layer tube was coextruded to form a 4 mil film. The tubing comprised:

An outer layer of a low linear low density polyethylene resin, e.g. Exxon 1001 series, blended with an extrudable tie layer resin anhydride modified LLDPE resin, e.g. Equistar Plexar PX3236.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236.

Example 4

A three layer food wrap laminate having a sodium nitrite food preservative additive(s) added to the inner layer (FIG. 4).

A three layer tube was coextruded to form a 4 mil film. The tubing comprised:

An outer layer of a linear low density polyethylene resin, e.g. Exxon 1001 series blended with an extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236, and sodium nitrite.

Example 5

A three layer food wrap laminate having a sodium nitrite food preservative additive(s) added to the outer and inner layers (FIG. 4).

A three layer tube was coextruded to form a 4 mil film. The tubing comprised:

An outer layer of a linear low density polyethylene resin, e.g. Exxon 1001 series, blended with an extrudable tie layer resin anhydride modified LLDPE resin, e.g. Equistar Plexar 3236, and containing sodium nitrite.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236, and containing sodium nitrite.

Example 6

A three layer food wrap laminate having a sodium nitrite food preservative additive(s) added to the outer and inner layers (FIG. 4).

A three layer tube was coextruded to form a 4 mil film. The tubing comprised:

An outer layer of a linear low density polyethylene resin, e.g. Exxon 1001 series, blended with an extrudable tie layer resin anhydride modified LLDPE resin, e.g. Equistar Plexar 3236, and containing sodium nitrite.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236, and containing sodium nitrite.

Example 7

A five layer food wrap laminate having no food preservative additive(s) therein (FIG. 2).

A five layer tube was coextruded to form a 4 mil film. The tubing comprised:

An outer layer of a linear low density polyethylene resin, e.g. Exxon 1001 series.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series.

Example 8

A five layer food wrap laminate having a sodium nitrite food preservative additive(s) added to the inner layer (FIG. 2).

A five layer tube was coextruded to form a 4 mil film. The tubing comprised:

An outer layer of a linear low density polyethylene resin, e.g. Exxon 1001 series.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series, and sodium nitrite.

Example 9

A five layer food wrap laminate having no food preservative additive(s) therein (FIG. 2).

A five layer tube was coextruded to form a 4 mil film. The tubing comprised:

An outer layer of a linear low density polyethylene resin, e.g. Exxon 1001 series.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series.

Example 10

A five layer food wrap laminate having a sodium nitrite food preservative additive(s) in the inner and outer layers (FIG. 2).

A five layer tube was coextruded to form a 4 mil film. The tubing comprised:

An outer layer of a linear low density polyethylene resin, e.g. Exxon 1001 series, and sodium nitrite.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series, and sodium nitrite.

As noted above, each of Examples 3-10 gave surprisingly and synergistic low oxygen permeability values, similar to the values set forth in Examples 1 and 2 of Table 2.

While in accordance with the patent statutes the best mode and preferred embodiment have been set forth, the scope of the invention is not intended to be limited thereto, but only by the scope of the attached claims.

What is claimed is:

1. A food wrap laminate, comprising:
   at least one thermoplastic outer layer and at least one hydrophobic moisture and gas resistant thermoplastic inner layer;
   at least one barrier layer;

a tie layer composition that is compatible with said hydrophobic polymer inner layer and said barrier layer, said tie layer composition comprising a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride, or a copolymer of said polyanhydride or said polymaleic anhydride with an olefin, with ethyl vinyl acetate, or with ethylene acrylate;

wherein at least one of said inner layers contains a food preservative, and wherein said food preservative comprises ascorbyl palmitate, calcium ascorbate, EDTA, calcium sorbate, caprylic acid, dehydroacetic acid or its sodium salt, disodium thylenebisdithiocarbamate, erythorbic acid, formaldehyde, methylparaben, sodium nitrate, potassium nitrate, n-octanoic acid, octyl gallate, potassium metabisulfite, potassium sorbate, propionic acid, propylparaben, quaternary ammonium chloride combination, silver nitrate, silver metal particles, silver nano particles, ionic silver compounds, sodium ascorbate, sodium benzoate, sodium bisulfite, sodium dimethyldithiocarbamate, sodium metabisulfite, sodium nitrite, potassium nitrite, sodium phosphate, sodium propionate, sodium sorbate, stannous chloride, stearyl citrate, sulfating agents, sulfur dioxide, or a tocopherol; or any combination thereof; and wherein said laminate has an oxygen transmission rate of less than about 1.0 cc/100 in$^2$/day.

2. The food wrap laminate of claim 1, wherein said thermoplastic outer layer and said hydrophobic thermoplastic inner layer, independently, comprises a polyolefin or a copolymer thereof; a polymer derived from a diene; a copolymer derived from a diene; polystyrene; a halocarbon containing polymer; a heterochain thermoplastic; a polysulfide; polyphthalamide; a polyurethane; a polyamide; a polyester; or any combination thereof; and wherein said barrier layer comprises a polyvinyl alcohol or a polyalkylene-vinyl alcohol copolymer, or a blend of either with another polymer; or a carbon monoxide-copolymer or interpolymers with polyvinyl alcohol or with polyalkylene-vinyl alcohol; a polyamide, or a polyamide copolymer, or a blend of either with another polymer; a polyvinyl acetate polymer, or a polyvinyl acetate copolymer, or blend of either with another polymer; or a polyvinylidene chloride, or a copolymer thereof; or any combination thereof.

3. The food wrap laminate of claim 2, wherein said thermoplastic inner layer comprises a polyethylene, a polyester, or a polyamide, or any combination thereof;

wherein the amount of said food preservative is from about 0.001% to about 5.0% based on the total weight of said hydrophobic thermoplastic inner layer, wherein said food preservative comprises sodium nitrite, sodium benzoate, silver nitrate, silver metal particles, silver nano particles, or ionic silver compounds, or any combination thereof; and wherein each said tie layer, independently, is said polyanhydride, an ethylene-maleic anhydride copolymer, or a copolymer of polymaleic anhydride; or any combination thereof; wherein said barrier layer is a copolymer of said ethylene-vinyl alcohol wherein the amount of ethylene in said copolymer is from about 30 to about 45 mole percent; or polyvinylidene chloride, or a copolymer thereof with vinyl chloride, acrylate, or acrylonitrile, wherein the total thickness of said at least one hydrophobic thermoplastic polymer outer and inner layers are is from about 65 to about 93%, wherein the total thickness of said tie layers is from about 3 to about 20%, and wherein the total thickness of said at least one barrier layer is from about 2 to about 1.5% based upon the total thickness (100%) of said food wrap laminate.

4. The food wrap laminate of claim 2, wherein said laminate has an oxygen transmission rate of less than about 0.1 cc/100 in$^2$/day.

5. The food wrap laminate of claim 2, wherein said food preservative comprises EDTA, calcium sorbate, caprylic acid, dehydroacetic acid or its sodium salt, sodium nitrate, potassium nitrate, n-octanoic acid, potassium metabisulfite, potassium sorbate, propionic acid, propylparaben, quaternary ammonium chloride, silver nitrate, silver metal particles, silver nano particles, ionic silver compounds, sodium benzoate, sodium bisulfite, sodium dimethyldithiocarbamate, sodium metabisulfite, sodium nitrite, potassium nitrite, sodium phosphate, sodium propionate, sodium sorbate, stannous chloride, sulfating agents, sulfur dioxide, or tocopherol; or any combination thereof.

6. The food wrap laminate of claim 2, wherein said hydrophobic thermoplastic inner polymer layer polymer comprises polyethylene including various low and high density polyethylenes, polypropylene and copolymers thereof, a copolymer of acrylonitrile-butadiene-styrene, a copolymer of methyl methacrylate-styrene, polybutadiene, polychloroprene, a copolymer of butadiene and styrene, polychlorotrifluoroethylene, polytetrafluoroethylene, fluorinated ethylene polypropylene copolymer, polyvinylchloride, polyvinylidene chloride, polyvinylidene fluoride, a blend of polyethylene and polytetrafluoroethylene, a copolymer of melamine formaldehyde, said polyurethane, said polyamide, or said polyester; or any combination thereof;

wherein said tie layer is located between said barrier layer and said inner layer and comprises said acrylate or said methacrylate blended with a polyolefin; said polyanhydride or said polymaleic anhydride; or said copolymer of said polyanhydride or of said polymaleic anhydride with either an olefin or with an ethyl-vinyl acetate; or any combination thereof;

wherein said barrier layer polymer is said polyvinyl alcohol, a copolymer of ethylene-vinyl alcohol, said polyamide, said carbon monoxide-copolymer or interpolymer with said polyvinyl alcohol or said polyalkylene vinyl alcohol copolymer; said polyvinylidene chloride; said polyvinylidene copolymer; or any combination thereof.

7. The food wrap laminate of claim 6, wherein said food preservative comprises sodium nitrite, sodium benzoate, silver nitrate, silver metal particles, silver nano particles, or ionic silver compounds, or any combination thereof;

wherein said outer layer is a hydrophobic thermoplastic layer;

wherein said barrier layer polymer optionally contains a phenol additive;

including a tie layer located between said outer hydrophobic thermoplastic polymer layer and said barrier layer; and wherein said laminate has an oxygen transmission rate of less than about 0.5 cc/100 in$^2$/day.

8. A food wrap laminate, comprising:
at least one outer hydrophobic thermoplastic polymer layer;
at least one barrier layer;
at least one first tie layer that is compatible with said outer layer and said barrier layer and is located between said outer polymer layer and said barrier layer;

at least one thermoplastic inner hydrophobic moisture and gas resistant polymer layer, at least one second tie layer that is compatible with said barrier layer and said inner layer and is located between said barrier layer and said inner layer;

wherein said first and or second tie layer, independently, comprise a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride, or a copolymer of said polyanhydride or said polymaleic anhydride with an olefin, with ethyl-vinylacetate, or with ethylene acrylate;

wherein at least one of said thermoplastic inner layers contains a food preservative, and wherein said food preservative comprises ascorbyl palmitate, calcium ascorbate, EDTA, calcium sorbate, caprylic acid, dehydroacetic acid or its sodium salt, disodium ethylenebisdithiocarbamate, erythorbic acid, formaldehyde, methylparaben, sodium nitrate, potassium nitrate, n-octanoic acid, octyl gallate, potassium metabisulfite, potassium sorbate, propionic acid, propylparaben, quaternary ammonium chloride combination, silver nitrate, silver metal particles, silver nanoparticles, ionic silver compounds, sodium ascorbate, sodium benzoate, sodium bisulfite, sodium dimethyldithiocarbamate, sodium metabisulfite, sodium nitrite, potassium nitrite, sodium phosphate, sodium propionate, sodium sorbate, stannous chloride, stearyl citrate, sulfating agents, sulfur dioxide, or a tocopherol; or any combination thereof; and wherein said laminate has an oxygen transmission rate of less than about 1.0 cc/100 in$^2$/day.

9. The food wrap laminate of claim 8, wherein said hydrophobic thermoplastic outer layer and said hydrophobic thermoplastic inner layer, independently, comprise a polyolefin or a copolymer thereof; a polymer derived from a diene; a copolymer derived from a diene; polystyrene; a halocarbon containing polymer; a heterochain thermoplastic; a polysulfide; a polyphthalamide; a polyurethane; a polyamide; or a polyester; or any combination of the preceding;

wherein said barrier layer comprises polyvinyl alcohol or a polyalkylene-vinyl alcohol copolymer, or a blend of either with another polymer; or a carbon monoxide-copolymer or interpolymer with polyvinyl alcohol or with polyalkylene-vinyl alcohol; a polyamide, or a polyamide copolymer, or a blend of either with another polymer; a polyvinyl acetate polymer, or a polyvinyl acetate copolymer, or blend of either with another polymer; or a polyvinylidene chloride, or a copolymer thereof.

10. The food wrap laminate of claim 9, including wherein said laminate has an oxygen transmission rate of less than about 0.05 cc/100 in$^2$/day.

11. The food wrap laminate of claim 9, wherein said hydrophobic thermoplastic outer layer and said hydrophobic thermoplastic inner layer, independently, comprise a polyethylene, a polyester, or a polyamide; or any combination thereof;

wherein said first tie layer or said second tie layer, independently, comprise said polymeric anhydride, an ethylene-maleic anhydride copolymer, or a copolymer of propylene maleic anhydride, or any combination thereof;

wherein said barrier layer is a copolymer of said ethylene-vinyl alcohol wherein the amount of ethylene in said copolymer is from about 30 to about 45 mole percent; or polyvinylidene chloride, or a copolymer thereof with vinylchloride, acrylate, or acrylonitrile; or any combination thereof;

wherein said food preservative comprises sodium nitrite, sodium benzoate, silver nitrate, silver metal particles, silver nano particles, or ionic silver compounds, or any combination thereof; and wherein the total thickness of said at least one or more thermoplastic outer polymer layers and/or said one or more thermoplastic inner polymer layers is from about 65 to about 93%, wherein the total thickness of said at least one or more tie layers is from about 3 to about 20%, and wherein the total thickness of said at least one or more barrier layers is from about 2 to about 15% based upon the total thickness (100%) of said laminate; and wherein said laminate has an oxygen transmission rate of less than about 0.5 cc/100 in$^2$/day.

12. The food wrap laminate of claim 9, wherein said hydrophobic thermoplastic outer layer polymer and said hydrophobic thermoplastic inner layer polymer, independently, comprise polyethylene including various low and high density polyethylenes, polypropylene and copolymers thereof, a copolymer of acrylonitrile-butadiene-styrene, a copolymer of methyl methacrylate-styrene, polybutadiene, polychloroprene, a copolymer of butadiene and styrene, polychlorotrifluoroethylene, polytetrafluoroethylene, fluorinated ethylene polypropylene copolymer, polyvinylchloride, polyvinylidene chloride, polyvinylidene fluoride, a blend of polyethylene and polytetrafluoroethylene, a copolymer of melamine formaldehyde, said polyurethane, said polyamide, or said polyester; or any combination thereof;

wherein the first tie layer and said second tie layer, independently, comprise said acrylate or said methacrylate blended with a polyolefin; said polyanhydride or said polymaleic anhydride; or said copolymer of said polyanhydride or of said polymaleic anhydride with either an olefin or with an ethyl-vinyl acetate; or any combination thereof;

wherein the barrier layer comprises said polyvinyl alcohol, a copolymer of ethylene-vinylalcohol, said polyamide, said carbon monoxide-copolymer or interpolymer with said polyvinyl alcohol or said polyvinyl alcohol copolymer; said polyvinylidene chloride; or said polyvinylidene copolymer; or any combination thereof;

wherein said food preservative comprises sodium nitrite, sodium benzoate, silver nitrate, silver metal particles, silver nano particles, or ionic silver compounds, or any combination thereof; and wherein said laminate has an oxygen transmission rate of less than 0.5 cc/100 in$^2$/day.

13. The food wrap laminate of claim 9, wherein said food preservative comprises EDTA, calcium sorbate, caprylic acid, dehydroacetic acid or its sodium salt, sodium nitrate, potassium nitrate, n-octanoic acid, potassium metabisulfite, potassium sorbate, propionic acid, propylparaben, quaternary ammonium chloride, silver nitrate, silver metal particles, silver nano particles, ionic silver compounds, sodium benzoate, sodium bisulfite, sodium dimethyldithiocarbamate, sodium metabisulfite, sodium nitrite, potassium nitrite, sodium phosphate, sodium propionate, sodium sorbate, stannous chloride, sulfating agents, sulfur dioxide, or tocopherol; or any combination thereof.

14. A food wrap laminate, comprising;
at least one barrier layer;
a food preservative;
at least one hydrophobic moisture and gas resistant thermoplastic inner polymer layer comprising a mixture of said food preservative and at least one tie compound that is compatible with said inner layer polymer and said barrier layer, wherein said inner layer tie compound comprises a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride, or a copolymer of said polyanhydride or said polymaleic anhydride with an olefin, with ethylvinylacetate, or with ethylene acrylate, and wherein said food preservative comprises ascorbyl palmitate, calcium ascorbate, EDTA, calcium sorbate, caprylic acid, dehydroacetic acid or its sodium salt, disodium ethylenebisdithiocarbamate, erythorbic acid, formaldehyde, methylparaben, sodium nitrate, potassium nitrate, n-octanoic acid, octyl gallate, potassium metabisulfite, potassium sorbate, propionic acid, propylparaben, quaternary ammonium chloride combination, silver nitrate, silver metal particles, silver nano particles, ionic silver compounds, sodium ascorbate, sodium benzoate, sodium bisulfite, sodium dimethyldithiocarbamate, sodium metabisulfite, sodium nitrite, potassium nitrite, sodium phosphate, sodium propionate, sodium sorbate, stannous chloride, stearyl citrate, sulfating agents, sulfur dioxide, or a tocopherol, or any combination thereof; and wherein said laminate has an oxygen transmission rate of less than about 1.0 cc/100 in$^2$/day.

15. The food wrap laminate of claim 14, wherein said food preservative comprises EDTA, calcium sorbate, caprylic acid, dehydroacetic acid or its sodium salt, sodium nitrate, potassium nitrate, n-octanoic acid, potassium metabisulfite, potassium sorbate, propionic acid, propylparaben, quaternary ammonium chloride, silver nitrate, silver metal particles, silver nano particles, ionic silver compounds, sodium benzoate, sodium bisulfite, sodium dimethyldithiocarbamate, sodium metabisulfite, sodium nitrite, potassium nitrite, sodium phosphate, sodium propionate, sodium sorbate, stannous chloride, sulfating agents, sulfur dioxide, or tocopherol; or any combination thereof.

16. The food wrap laminate of claim 14, wherein said hydrophobic thermoplastic inner layer polymer comprises a polyolefin or a copolymer thereof; a polymer derived from a diene; a copolymer derived from a diene; polystyrene; a halocarbon containing polymer; a heterochain thermoplastic; a polysulfide; a polyphthalamide; a polyurethane; a polyamide; or a polyester; or any combination thereof; and wherein said barrier layer comprises said polyvinyl alcohol, or a polyalkylene-vinyl alcohol copolymer, or a blend of either with another polymer, or a carbon monoxide-copolymer or interpolymer with polyvinyl alcohol or with polyalkylene-vinyl alcohol copolymer; a polyamide, or a polyamide copolymer, or a blend of either with another polymer; a polyvinyl acetate polymer or a polyvinyl acetate copolymer, or blend of either with another polymer; or a polyvinylidene chloride; or any combination thereof.

17. The food wrap laminate of claim 16, wherein said hydrophobic thermoplastic inner layer comprises a polyethylene, a polyester, or a polyamide, or any combination thereof;

wherein said tie compound is said polyanhydride, as ethylene-maleic anhydride copolymer, or a copolymer of propylene maleic anhydride; or any combination thereof;

wherein said barrier layer is a copolymer of said ethylene-vinyl alcohol wherein the amount of ethylene in said copolymer is from about 30 to about 45 mole percent; or said polyvinylidene chloride, or a copolymer thereof with vinyl chloride, acrylate, or acrylonitrile;

wherein said food preservative comprises sodium nitrite, sodium benzoate, silver nitrate, silver metal particles, silver nano particles, or ionic silver compounds, or any combination thereof, wherein said laminate has an oxygen transmission rate of less than about 0.5 cc/100 in$^2$/day.

18. The food wrap laminate of claim 14, including at least one thermoplastic outer layer;

wherein said thermoplastic outer layer comprises a polyolefin or a copolymer thereof; a polymer derived from a diene, or a copolymer derived from a diene; polystyrene; a halocarbon polymer; a heterochain thermoplastic; a polysulfide; a polyphthalamide; a polyurethane; a polyimide; or a polyester; or any combination thereof.

19. The food wrap laminate of claim 18, wherein said thermoplastic outer layer comprises a polyethylene, a polyester, or a polyamide; or any combination thereof;

wherein said thermoplastic outer layer has at least one tie compound blended therein that is compatible with said outer layer and said barrier layer;

wherein said thermoplastic outer layer tie compound comprises a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride, or a copolymer of said polyanhydride or said polymaleic anhydride with an olefin, with ethylvinylacetate, or with ethylene acrylate; or any combination thereof;

wherein said food preservative comprises sodium nitrite, sodium benzoate, silver nitrate, silver metal particles, silver nano particles, or ionic silver compounds, or any combination thereof; and wherein the total thickness of said at least one thermoplastic inner polymer layer and/or said at least one thermoplastic outer polymer layer including any tie layer compound therein is from about 75% to about 98%, and wherein the total thickness of said one or more barrier layers is from about 2% to about 25% based upon the total thickness (100%) of said laminate.

20. The food wrap laminate of claim 18, wherein said food preservatives comprise sodium nitrite, sodium benzoate, silver nitrate, silver metal particles, silver nano particles, ionic silver compounds, or any combination thereof, and wherein said laminate has an oxygen transition rate of less than about 0.1 cc/100 in$^2$/day.

* * * * *

UNITED STATES PATENT AND TRADEMARK OFFICE
CERTIFICATE OF CORRECTION

PATENT NO.        : 8,557,372 B2
APPLICATION NO.   : 12/932470
DATED             : October 15, 2013
INVENTOR(S)       : Donald Kubik and Barbara Nygaard It is certified that error appears in the above-identified patent and that said Letters Patent is hereby corrected as shown below:

In the Claims:

Claim 3, column 18, line 3: "1.5%" should be "15%"

Claim 17, column 22, line 5: "as" should be "an"

Signed and Sealed this
Seventeenth Day of December, 2013

Margaret A. Focarino
*Commissioner for Patents of the United States Patent and Trademark Office*